GENERATION OF BEACON SIGNALS FOR COMMUNICATION SATELLITE
Filed April 13, 1965
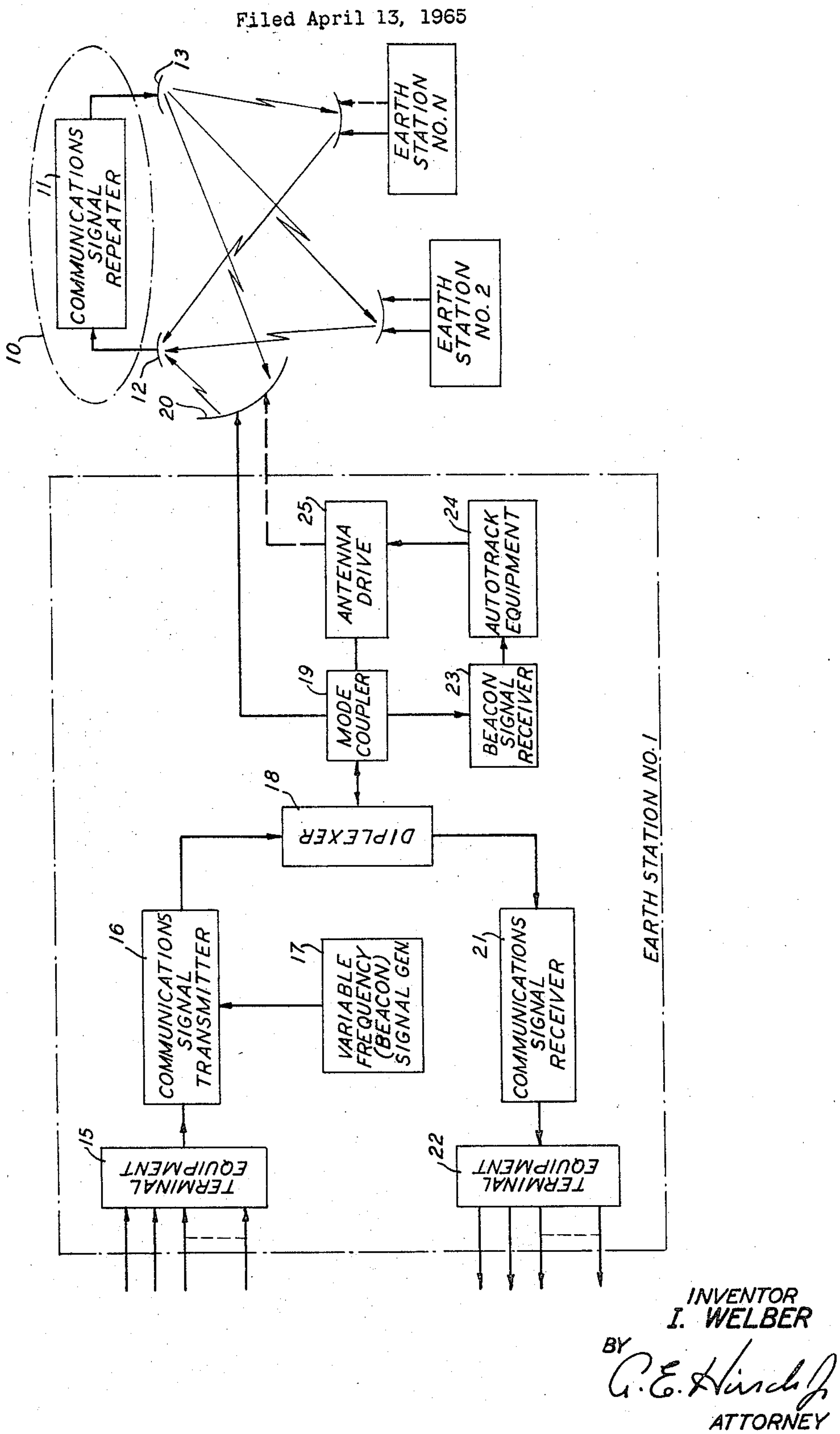
INVENTOR
I. WELBER
BY G. E. Hirsch Jr.
ATTORNEY

United States Patent Office 3,378,845
Patented Apr. 16, 1968

3,378,845

GENERATION OF BEACON SIGNALS FOR COMMUNICATION SATELLITE

Irwin Welber, New Providence, N.J., assignor to Bell Telephone Laboratories, Incorporated, New York, N.Y., a corporation of New York Filed Apr. 13, 1965, Ser. No. 447,617
4 Claims. (Cl. 343—100)

ABSTRACT OF THE DISCLOSURE

Autotrack apparatus for continuously direction an antenna toward a communication satellite generally relies on a beacon signal radiated by the satellite. Heretofore the beacon signal has been generated in the satellite. The necessity of generating this beacon signal in the satellite may be eliminated by apparatus which generates the beacon at the earth station and then transmits the beacon in conjunction with the communication signal to the satellite.

This invention relates to communications satellite systems, and, more particularly, to the control system employed for directing an antenna at an earth terminal station toward a communications satellite in orbital range of the station. It has for its principal objects a reduction in the apparatus requirements of the satellite itself and and increase in the flexibility with which transmission frequencies between the earth station and the satellite may be allocated.

One of the primary functions of the antenna control system employed at an earth terminal station of a satellite communications system is to establish a communications link between the earth terminal and the satellite by causing the communications antenna at the terminal to acquire and continuously track the satellite. Conventionally, the communications satellite continuously radiates a signal whose frequency and initial polarization are known. The tracking system at the terminal station senses the direction of arrival of the signal, which is generally known as a beacon signal, from the satellite, for example, through an examination of the higher order modes of propagation of the received signal. The discrepancy, if any, between the direction the antenna is pointing and the actual direction of the satellite may thus be determined. When this direction does not coincide with the antenna pointing direction, error correcting voltages are generated to enable the antenna pointing system to steer the antenna toward the satellite.

Although such a system assures accurate tracking of the satellite, it is apparent that the system is entirely dependent on the continued operation of the beacon signal generator carried within the satellite. A power or component failure is fatal; there can be no repair. In addition the beacon signal generator, typically a simple oscillator, consumes valuable power, adds additional weight to the satellite, and is restricted to operation on one preassigned frequency, or to operation on a very restricted number of selected frequencies.

In the event that the satellite is simultaneously being tracked and used for communications by several independent earth terminals, generally at geographically separated locations, it is necessary that each terminal detect the beacon signal for tracking. In such a system, however, frequency allocation becomes a problem, since it is desirable for each of the communicating stations to have at its disposal as wide a message frequency band as possible. Further, it is often desirable to change the frequency allocation among stations from time to time. A fixed frequency beacon signal therefore often stands in the way of the optimum distribution and utilization of the available frequency spectrum.

The present invention overcomes these difficulties and yet permits automatic tracking of a satellite by way of a beacon signal radiated from a satellite. In accordance with the invention, a beacon signal is generated, with a predetermined frequency or with a number of predetermined frequencies, at one or all of the earth terminal stations communicating with a satellite repeater. As soon as the satellite is acquired by the earth terminal, for example, through the services of radar equipment or, more commonly, by means of satellite orbital data accumulated from previous experience or generated through the interpolation of launch data, the beacon signal is transmitted to the satellite. It is treated by the satellite repeater as an ordinary communications signal, and typically is translated in frequency in the communications channel of the satellite, amplified, and re-radiated via the communications signal antenna system of the satellite. It may then be received by any one of the earth terminals tracking the satellite.

Since the beacon signal passes through the message signal repeater of the satellite, which ordinarily accommodates a relatively wide band of frequencies, the single frequency, or narrow frequency band beason signal may be placed at any desired point or points within the pass band of the repeater. Additionally, a number of independent beacon signals may be employed, each passing through the repeater at specified points in the pass band. If the pass band is divided into sub-bands, which are individually allocated to the several terminal stations, the beacon signals may be spotted either in a selected communications channel, in the guard band between the communications channels, or in a channel employed for inter-station testing or communications.

It is evident that the satellite repeater is relieved of the responsibility of generating the beacon signal. This results in a saving of apparatus, weight, and power within the satellite. Since the beacon signal is generated at the terminal station, a failure does not disable the automatic tracking functions of the several stations. Moreover, a change in frequency allocation necessitates only that the beacon frequency also be changed.

The invention will be more fully apprehended from the following detailed description of an illustrative communications satellite system.

A schematic block representation of a typical earth terminal station for a satellite communications system is shown in the figure. Similar earth stations, e.g., station No. 1 through station N, may be located at geographically separated sites. The several stations communicate with one another by directing communications signals toward active communications satellite 10, and receiving signals radiated by the satellite. Satellite 10 includes, typically, a signal receiver, a signal amplifier and a signal transmitter. Each earth station continually tracks the satellite, which may be either in a synchronous or synchronous orbit, for example, by monitoring beacon signals radiated by the satellite, analyzing the signals, and developing error control signals which may be used to control the drive mechanism associated with communications antenna 20. Message signal information is received at the earth station by way of telephone lines or the like, and is processed in terminal equipment 15 in any desired way. For example, a form of signal coding may be employed to prepare a number of independent signals for transmission on a single channel. The composite communications signal so developed is thereupon supplied to transmitter 16 which develops the necessary carrier and modulation products for transmission.

In accordance with the present invention the beacon signal used for tracking is generated at the earth station and made a part of the composite communications signal transmitted to the satellite. Beacon signal generator 17 is thus employed to develop a signal whose frequency, bandwidth, and amplitude may be controlled as desired at the ground station. The beacon signal is similarly applied to transmitter 16 and combined with the message signal information for transmission. Modulated signal information issuing from transmitter 16 is supplied by way of diplexer 18 and mode coupler 19 to transmitting antenna 20.

The signals are received at satellite 10 by way of antenna 12 and are passed through communications signal repeater 11 and re-transmitted by way of antenna 13. Ordinarily signal repeater 11 translates the frequency of the received signals to a lower or higher frequency before re-transmission takes place. Since the translation interval is a known, fixed constant, the beacon signal is also translated by the same interval. Consequently, each ground station receives both message signal information and beacon signal information on the new frequencies.

Since antenna 13 generally has a radiation pattern that at least covers the earth's surface, the radiated signals may be received by all earth terminals trained on the satellite. Simultaneously, other earth terminals may direct signals to the satellite on different frequency channels, or in timed sequence with signals from other stations, in order that a plurality of different signals pass through the communications repeater at any time. To accomplish this, each station is generally assigned a frequency band or select number of frequency bands for operation. The beacon signal generated, for example, at earth station No. 1 may be placed in any one of the bands or preferably in the guard space between bands. Since the beacon signal from generator 17 may be received by all stations it may be used by all stations for tracking the satellite. Alternatively, each station may generate its own beacon signal and transmit it on an assigned frequency, in, or between message signal bands. By agreement, the frequency allocation of the beacon signal or signals may be changed and any other station may at any one time be authorized to develop the beacon signal.

Signals received from the satellite by way of antenna 20 are delivered to mode coupler 19 wherein communications signals are separated from the composite received signal and delivered by way of diplexer 18 to communications signal receiver 21. These signals are converted to individual message signals in terminal equipment 22 and delivered to the appropriate line leaving the earth station.

Mode coupler 19 additionally delivers the beacon signal to beacon signal receiver 23. The beacon signal is further analyzed and delivered to autotrack equipment 24 which processes it and develops therefrom pointing error signals which are used to actuate antenna drive system 25. Drive system 25 is responsible for training antenna 20 continuously on the hovering or orbitting satellite.

Both the communications signal processing portion of the system and the antenna control portion employ elements well-known in the satellite communications art. Suitable elements are described in the July 1963 issue of the Bell System Technical Journal. Beacon signal generator 17 may be of any desired construction. For example, it may comprise an oscillator whose frequency, output amplitude and bandwidth may be individually controlled. Precise frequency control is generally secured in such apparatus by way of crystals or the like. Beacon signal receiver 23 and mode coupler 19 may be of the exact construction described in the above-cited Bell System Technical Journal article.

The above described arrangements are of course merely illustrative of the applications of the principles of the invention. Numerous other arrangements may be devised by those skilled in the art without departing from the spirit and scope of the invention.

What is claimed is:

1. A satellite communications system which comprises:
a plurality of earth terminal stations each equipped to track an earth satellite carrying a communications signal repeater,
means at each of said terminals for continuously directing, a communications antenna toward a satellite repeater,
means at each of said terminals for transmitting communications signals to said satellite and for receiving communications signals for said satellite,
means at at least one of said terminal stations for generating a beacon signal at a selected frequency within the pass band of said satellite signal repeater, means for transmitting said beacon signal and said communication signals to said satellite for retransmission,
means at each of said terminals for receiving the beacon signal from said satellite,
and means at each of said terminals for employing said received beacon signal for controlling said antenna directing means.

2. A satellite communications system as defined in claim 1 wherein:
said beacon signal frequency is selected to be between frequency bands assigned for adjacent communications channels within the pass band of said satellite signal repeater.

3. A satellite communications system as defined in claim 1 wherein:
said beacon signal frequency is selected to be within one of several frequency bands assigned as communications channels within the pass band of said satellite signal repeater.

4. A communications satellite tracking system which comprises:
an earth satellite which includes, means for receiving communications signals, means for amplifying received signals, and means for transmitting said amplified signals;
and an earth station which includes, a tracking antenna, autotrack means responsive to beacon signals radiated by said satellite for continuously directing said antenna toward said satellite,
means for generating a beacon signal,
a communications signal transmitter,
means for supplying message signals and said beacon signal to said transmitter,
means for supplying signals from said transmitter to said antenna,
means responsive to signals received by said antenna from said satellite for independently receiving said message signals and said beacon signal,
and means for supplying said received beacon signal to said autotrack means.

References Cited

UNITED STATES PATENTS 3,167,760 1/1965 Karp et al. -------- 343—6.5 X
3,262,116 7/1966 Hutchinson et al. ---- 343—100

RODNEY D. BENNETT, *Primary Examiner.*

R. E. BERGER, *Assistant Examiner.*